United States Patent [19]
Sugimizu
[11] 3,884,407
[45] May 20, 1975

[54] PINCH ROLLER SHIFTING MECHANISM FOR SEQUENTIALLY SHIFTING A PINCH ROLLER IN TWO SUBSTANTIALLY PERPENDICULAR DIRECTIONS TOWARD A CAPSTAN

[75] Inventor: Masayuki Sugimizu, Kanagawa, Japan

[73] Assignee: Denki Onkyo Company, Limited, Tokyo, Japan

[22] Filed: Sept. 11, 1973

[21] Appl. No.: 396,333

[52] U.S. Cl. .................. 226/90; 226/179; 226/180; 226/187; 360/90
[51] Int. Cl.... G03b 1/56; G11b 15/24; B65h 17/20
[58] Field of Search ...... 179/100.2 Z; 274/4 E, 4 G; 226/89, 90, 180, 179, 187; 360/90–96

[56] References Cited
UNITED STATES PATENTS
3,662,938 5/1972 Hagiwara .............................. 226/90

*Primary Examiner*—Bernard Konick
*Assistant Examiner*—Robert S. Tupper
*Attorney, Agent, or Firm*—Armstrong, Nikaido & Wegner

[57] ABSTRACT

A pinch roller shifting mechanism for tape recorder or tape player which is adapted so that the pinch roller lifts up to a position opposing the capstan at a specified distance therefrom in accordance with movement of a first solenoid plunger and the lifted pinch roller then moves horizontally to a position where it contacts the capstan in accordance with movement of a second solenoid plunger. A guide means guides the pinch roller in its vertical and horizontal movement.

7 Claims, 7 Drawing Figures

PINCH ROLLER SHIFTING MECHANISM FOR SEQUENTIALLY SHIFTING A PINCH ROLLER IN TWO SUBSTANTIALLY PERPENDICULAR DIRECTIONS TOWARD A CAPSTAN

BACKGROUND OF THE INVENTION

The present invention relates to a pinch roller shifting mechanism which is employed for magnetic tape recording or reproduction with a tape recorder or tape player.

Generally, in use of the tape recorders and tape players, a magnetic tape is set between the capstan and the pinch roller and is forwarded by rotating the capstan. The pinch roller is adapted to be moved to contact and separate from the external periphery of the capstan.

Since it is desirable to design the entire mechanism so that setting of the magnetic tape is not hindered by the pinch roller in its position when the magnetic tape is set at the specified position, the shaft of the pinch roller is provided on the rotary arm. In this configuration, for setting the magnetic tape, the arm is rotated to move the pinch roller away from the capstan and then to move it into contact with the capstan after setting of the tape. On the other hand, the pinch roller is designed to be elevated in reference to the capstan so that the pinch roller is lowered before setting the tape and lifted after setting of the tape, thus contacting the capstan.

The conventional pinch roller shifting mechanisms have been designed to drive the pinch roller through the manual lever operation of the rotary arm, cam, etc. or by means of a motor. Accordingly, the effect of the pinch roller cannot be completely eliminated when setting the magnetic tape. Further, the conventional pinch roller shifting mechanism cannot be made small because of its complicated structure.

The present invention provides a pinch roller shifting mechanism which can eliminate completely the adverse effect of the pinch roller and is simple in construction, trouble-free in operation and compact in overall design.

SUMMARY

The present invention is related to a pinch roller shifting mechanism to be employed in a magnetic recording and reproducing apparatus such as a tape recorder, comprising a capstan for forwarding a magnetic tape and a pinch roller having a shaft in parallel with the axial direction of said capstan for free rotation. A support member which supports said pinch roller can move in the axial direction of the capstan to cause said pinch roller to move in said axial direction of the capstan and in the specified direction to cause said pinch roller to move in the direction to approach or separate from the capstan. A first driving means which comprises a first solenoid plunger which has a first solenoid rod which is moved in the axial direction by supplying current to the solenoid and crank arm which transmits movement of said first solenoid rod to said support member through a lever operation and is adapted to cause said support member to move in the axial direction of the capstan. A second driving means comprises a second solenoid plunger having a second plunger rod which is moved in the axial direction by supplying the current to the solenoid, a first rotary arm which converts linear movement of said second plunger rod to a rotary movement and a crank arm which transmits the rotary movement of said rotary arm to said support member to cause said support member to rotate so that said pinch roller approaches to contact the capstan. A guide means which comprises a wall guides the movement of said support member up to a position where said pinch roller opposes said capstan in the axial direction of said capstan and the surface which guides movement of said support member so that said pinch roller moves from said position to approach and contact said capstan.

BRIEF DESCRIPTION OF THE DRAWINGS

The present invention is illustrated in detail by the accompanying drawings wherein.

DETAILED DESCRIPTION OF THE INVENTION

Figure 1:
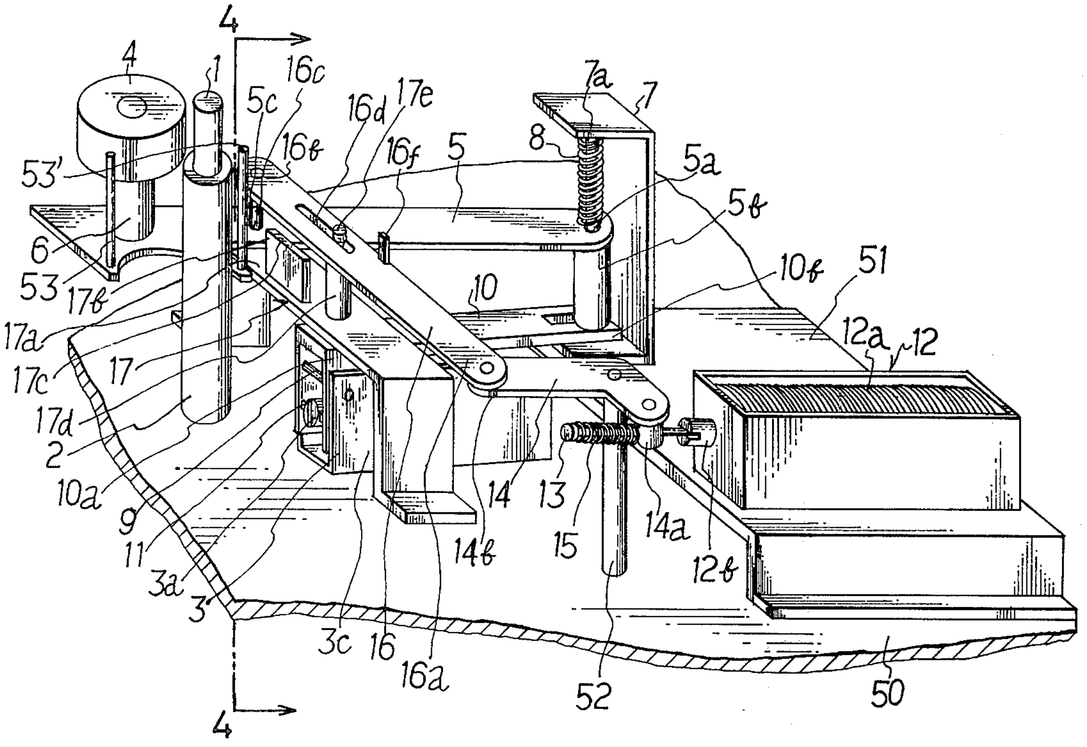
FIG. 1 is a perspective view illustrating the principal parts of the mechanism in accordance with the present invention.

Referring to FIG. 1, there is shown a principal part of the pinch roller shifting mechanism in accordance with the present invention.

Capstan 1 for forwarding the magnetic tape is provided so that it is projected by shaft 2 above the deck plate (not shown) of the magnetic recording and reproducing device of a tape recorder or the like. This capstan is rotated at a fixed speed by the drive mechanism (not shown) such as a motor or the like.

The first solenoid plunger 3 is designed so that plunger rod 3_a_ retreats or the projecting length of said plunger rod 3_a_ becomes short when the current is supplied to the solenoid. This causes the shift of pinch roller 4 made of an elastic material such as, for example, rubber in the axial direction (hereinafter referred to as the "vertical direction") of said capstan. Pinch roller 4 is arranged at a position where said pinch roller opposes capstan 1 with the specified distance when it is moved or lifted in the vertical direction and is rotatably mounted on one end of arm support member 5 which is arranged in a direction (hereinafter referred to as the "horizontal direction" according to the drawings) which intersects at a right angle to the axial direction of said capstan through shaft 6.

Bearing part 5_b_ which extends in the vertical direction is provided with shaft hole 5_a_. The bearing part is integral with support member 5 at the end of said support member.

Receiving part 7 is fixed with shaft 7a which is located along the vertical direction and longer than the length of said shaft hole 5a, and shaft 7a passes through said shaft hole 5a. The upper part of shaft 7a which is exposed from shaft hole 5a is wound with first coil spring 8 which pushes down support member 5 to maintain a position where the pinch roller is not opposed to the capstan. Lever arm 10 which is arranged in the horizontal direction so that its one end part 10a is rotatably attached to frame 3c of first solenoid plunger 3 with pivot pin 9 and the other end part 10b is forked and inserted into the lower end side of shaft 7a. This end part 10b is designed to contact the lower end surface of bearing part 5b of support member 5 and to it slide along shaft 7a. Arm 10 is made with end part 10a bent downward and its extreme end is rotatably connected to the end part of plunger rod 3a of first solenoid plunger 3 with shaft pin 11. Accordingly, when the current is supplied to the solenoid of solenoid plunger 3 to retreat plunger rod, lever arm 10 rotates at pivot pin 9 as the fulcrum to lift end part 10b. Accordingly, support member 5 lifts to cause pinch roller 4 to lift.

Support member 5 is provided with auxiliary guide pins 53 and 53' for guiding the magnetic tape at both sides of pinch roller 4.

Second solenoid plunger 12 which is designed so that plunger rod 12b retreats or the projecting length of the plunger rod becomes short when the current is supplied to solenoid 12a. This causes said pinch roller to shift in the direction intersecting at a right angle to the axial direction of said capstan or the horizontal direction and is horizontally arranged at a fixed position of base plate 50 through sub plate 51.

Shaft rod 13 which extends in the direction of extension of plunger rod 12b is provided at the extreme end of said plunger rod 12b and is inserted through end part 14b of L-shaped first rotary arm 14.

Coil spring 15 for absorbing shock is wound on the part of the shaft rod located between the extreme end of shaft rod 13 and rotary arm 14. First rotary arm 14 is supported so that the central part of 14 is arm 14is supported rotatably in the horizontal plane by support shaft 52 and is rotated counterclockwise in the drawing when said shaft rod 13 is retreated according to retreat of plunger rod 12b.

One end part 16a of crank arm 16 which is horizontally arranged is rotatably mounted at other end 14b of first rotary arm 14. This crank arm 16 is provided with shaft 16c which is projected downward and fixed at other end part 16b.

On the other hand, through hole 5c passing through in the vertical direction is provided in the specified position close to pinch roller 4 of said support member 5 and shaft 16c is inserted into through hole 5c.

Support member 5 and crank arm 16 are arranged to form an approximate right angle therebetween. Accordingly, when first rotary arm 14 rotates counterclockwise, support member 5 rotates counterclockwise in accordance with movement of crank arm 16 and pinch roller 4 approach to pressure-contact capstan 1.

Figure 4:
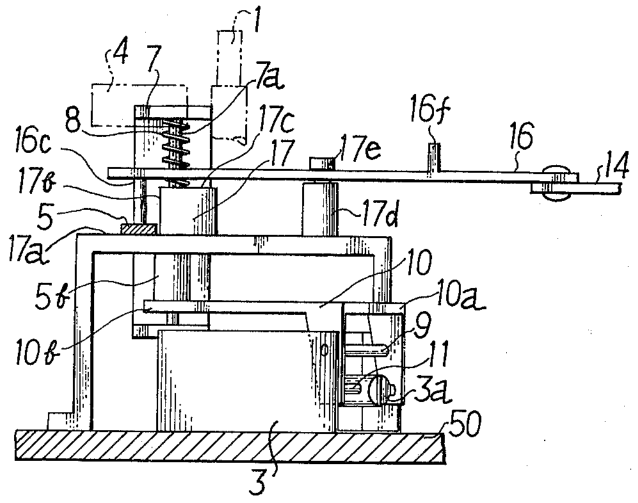
FIG. 4 is a cross sectional side view as seen along line 4 — 4 in FIG. 1.
Figure 5:
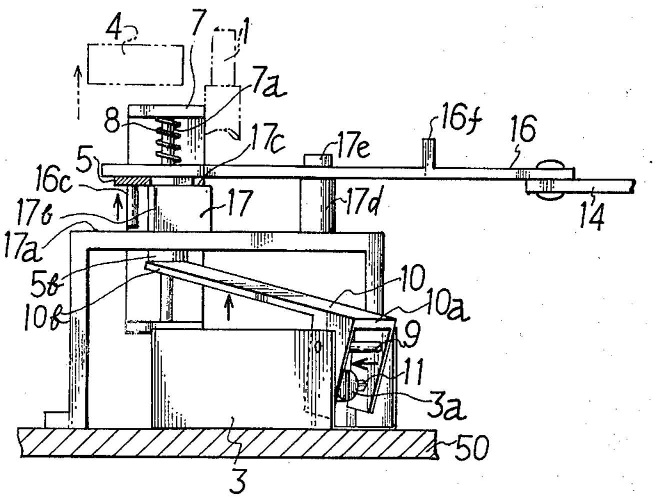
FIG. 5 is a view of the mechanism in which the support member shown in FIG. 4 is lifted and also a cross sectional side view as seen from the same position in FIG. 4.
Figure 6:
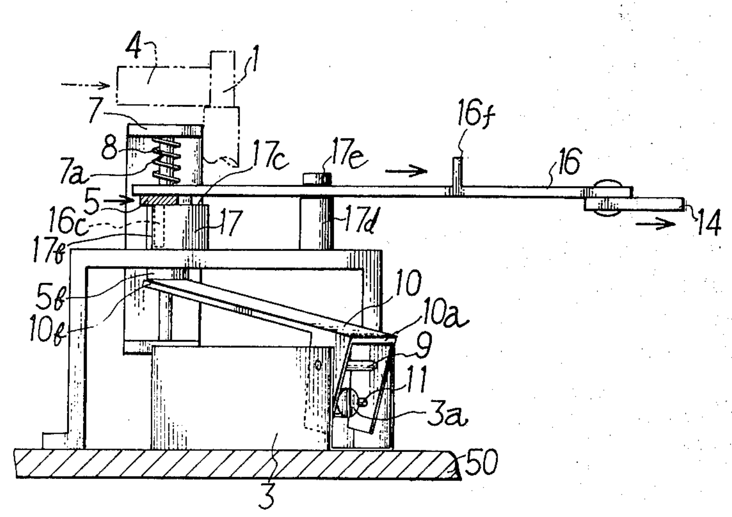
FIG. 6 is a view of the mechanism in which the support member shown in FIG. 4 moves horizontally to cause the pinch roller to be forcibly depressed onto the capstan and also a cross sectional side view as seen from the same position in FIG. 4.

Guide member 17 which guides support member 5 is provided at a position close through hole 5c in the lower side of support member 5. Guide member 17, as shown in FIG. 4, comprises horizontal plane 17a, vertical wall 17b which is bent upwardly at a right angle from said horizontal plane and horizontal plane 17c which is bent at a right angle to said wall. Support member 5 is mounted on lower plane 17a as shown in FIG. 4 when first solenoid plunger 3 is not operating and lifts along vertical wall 17b as shown in FIG. 5 when support member 5 is lifted. When second solenoid plunger 12 operates, support member 5 rotates horizontally along upper plane 17c from the lifting limit position.

Guide member 17 is provided with support shaft 17d which is projected upwardly. Upright screw 17e is provided at the extreme end face of support shaft 17d, while thin long through hole 16d is provided in the lengthwise direction on arm 16 and screw 17e is inserted into through hole 16e. The part around through hole 16d of arm 16 is supported by the extreme end face of shaft 17d. In this case, the diameter of screw 17e is selected to allow a certain amount of play in reference to the width of through hole 16d.

Small projection 16f which projects upwardly is provided at the specified position on the upper side of crank arm 16. This small projection actuates the mechanism which moves guide pins 18 and 18' in the direction in parallel with the direction from the pinch roller to the capstan when pinch roller 4 moves to contact capstan 1.

Figure 2:
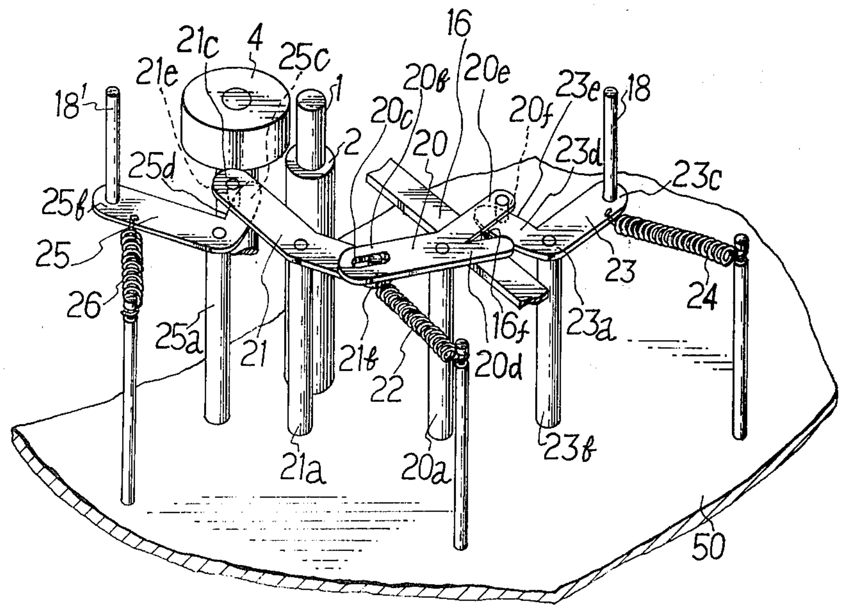
FIG. 2 is a partial view of the mechanism of the present invention to be added to the principal part shown in FIG. 1, illustrating an overlapped view of the pinch roller, capstan and part of the crank arm which are also shown in FIG. 1.
Figure 3:
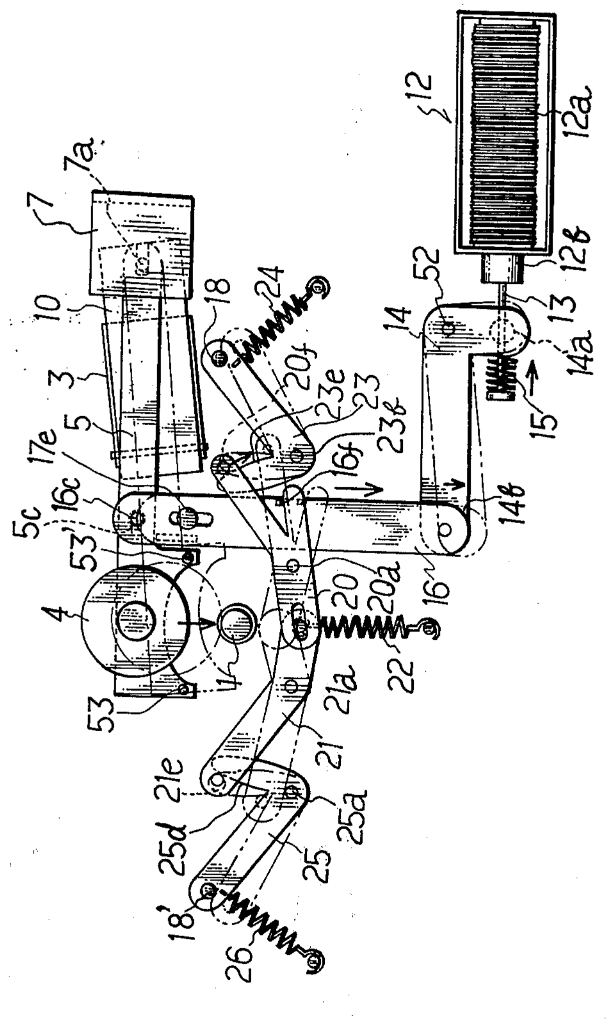
FIG. 3 is a plan view of the mechanism in accordance with the present invention with the two-dotted phantom line of the mechanism which is operating.

Referring to FIG. 2, there is shown a mechanism to move guide pins 18 and 18', each being located at the sides of a line between the pinch roller and capstan. Second rotary arm 20 and third rotary arm 21 are rotatably supported by support shafts 20a and 21a provided in parallel with the capstan at their centers and are arranged horizontally. End part 21b of one arm 21 is pulled by second coil spring 22 in parallel with the direction from the pinch roller to the capstan and is connected to end part 20b of arm 20 through shaft pin 21c. End part 20b is provided with long hole 20c through which shaft pin 21c is inserted.

The other end of arm 20 is forked and is adapted so that one end part 20d of the forked arm engages with said small projection 16f of arm 16 and end part 20b is depressed by small projection 16f when arm 16 moves in the direction indicated by an arrow and accordingly arm 20 moves clockwise. Other end part 20e of said forked arm 20 is provided with projection 20f which contacts fourth arm 23. Fourth rotary arm 23 is L-shaped and is supported rotatably by support shaft 23b at its center 23a. One end part 23c of arm 23 is provided with guide pin 18 uprightly and provides a pulling force along the direction from the pinch roller to the capstan by third coil spring 24. Other end part 23d of fourth arm 23 has internal side edge 23e with a smooth specified curve (described later) and projection 20f of said second arm 20 contacts this side edge. Projection 20f serves to prevent arm 23 from rotating in the clockwise direction and side edge 23e is formed with such a curve that arm 23 rotates clockwise when arm 20 rotates clockwise and projection 20f moves toward the central part of arm 23. In other words, the curve of side edge 23e is designed to approach the center of rotation (support shaft 20a) of arm 20 as said curve advances toward central part 23a; accordingly, fourth arm 23 moves clockwise while being pulled by spring 24 in accordance with clockwise movement of second arm 20. Thus guide pin 18 moves along the direction from the pinch roller to the capstan.

End part 21*c* of third rotary arm 21 is provided with projection 21*e* similar to projection 20*f* of second rotary arm 20 and engages with fifth rotary arm 25 symmetrical to fourth rotary arm 23. Fifth rotary arm 25 is L-shaped and is rotatably supported by support shaft 25*a* at its center. End part 25*b* at which guide pin 18' is provided with a force to rotate in the counterclockwise direction shown in the drawing by fourth coil spring 26. Other end part 25*c* of fifth arm 25 is designed so that its side edge 25*d* has a similar curve to that described above and counterclockwise rotation of arm 25 is limited through movement of projection 21*e* of arm 21 which contacts said side edge 25*d*.

When crank arm 16 moves to cause second rotary arm 20 to rotate clockwise, third rotary arm 21 is rotated counterclockwise through shaft pin 21*c*, then fifth rotary arm 25 rotates counterclockwise and guide pin 18' moves.

As clearly seen from the above, support member 5 which supports pinch roller 4 is moved in the axial direction of the capstan by the first driving means comprising first solenoid plunger 3 and lever arm 10. Support member 5 is held by the first resetting means comprising coil spring 8 at a position where the pinch roller does not oppose the capstan. Support member 5 is moved in the direction where the pinch roller approaches the capstan by the second driving means comprising second solenoid plunger 12, first rotary arm 14 and crank arm 16. In this case, furthermore, support member 5 is designed so that it can be moved by said second driving means only after having been moved by the first driving means.

The resetting force of the support member from horizontal movement by the second driving means is given by the second resetting means comprising second coil spring 22 for resetting in a mechanism to actuate guide pins 18 and 18', that is, the guide pin actuating means comprising rotary arms 20, 21, 23 and 25.

Figure 7:
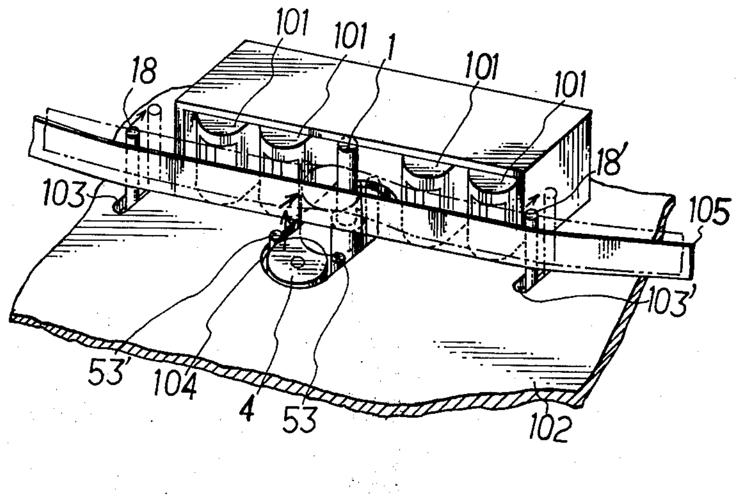
FIG. 7 is a partial perspective view illustrating the mechanism in accordance with the present invention employed in a tape recorder or tape player.

Referring to FIG. 7, there is shown the part of an example of the tape recorder employing the pinch roller in accordance with the present invention.

Capstan 1 is provided at the center between a plurality of heads 101 and guide pins 18 and 18' are arranged at both sides of the heads. Guide pins 18 and 18' project from thin long through holes 103 and 103' provided in deck plate 102. Through hole 104 is provided at the front side of capstan 1 on deck plate 102. Pinch roller 4 projects and retreats through this through hole 104.

When pinch roller 4 is under through hole 104, guide pins 18 and 18' are located at more forward positions than heads 101. Under this condition, magnetic tape 105 is set between guide pins 18 and 18' and head 101. After this, when the first and second solenoid plungers are operated in sequence, pinch roller 4 projects from through hole 104, guide pins 18 and 18' moves to more rear positions than head 101. The instant pinch roller 4 contacts the capstan, magnetic tape 105 is depressed onto capstan 1 by pinch roller 4 and can contact the front side of the head.

In case of the mechanism according to the present invention, the pinch roller does not hinder the setting of a magnetic tape as described above and therefore the setting of the magnetic tape can be extremely easily performed. Since the pinch roller is shifted by the solenoid plunger and the guide means, the pinch roller is completely shifted. Furthermore, the unit can be made compact since the mechanism can be mechanically simplified.

What is claimed is:

1. A pinch roller shifting mechanism for tape recorder or tape player comprising:

a. a capstan for forwarding a magnetic tape, b. a pinch roller rotatably mounted on a shaft parallel to the axis of said capstan, c. support means for supporting said pinch roller and for moving said pinch roller in the axial direction of said capstan and for moving said pinch roller in another direction perpendicular to said axial direction to move said pinch roller toward and away from said capstan, d. a first driving means comprising a first solenoid plunger having a first plunger rod which moves in its axial direction when said first solenoid plunger is energized, e. first coupling means connecting said first plunger to said support means for moving said support means in the axial direction of said capstan wherein said pinch roller is moved to a position in the same horizontal plane as said capstan in response to the movment of said first plunger rod, f. a second driving means comprising a second solenoid plunger having a second plunger rod which moves in its axial direction when said second solenoid plunger is energized, g. second coupling means connecting said second plunger to said support means for moving said support means from a position where said pinch roller opposes said capstan to a position where said pinch roller contacts said capstan whereby said pinch roller contacts said capstan in response to the movement of said second plunger rod, and h. a unitary guide means comprising a vertical wall means in contact with said support means for guiding the movement of said support means in the axial direction of said capstan until said pinch roller rises to a position opposing said capstan and a horizontal surface means in contact with said support means when it is in its raised position for guiding the horizontal movement of said support means and maintaining the vertical alignment of said pinch roller with said capstan to guide said pinch roller from a position where said pinch roller opposes said capstan to a position where it contacts said capstan.

2. A pinch roller shifting mechanism in accordance with claim 1, including a first resetting means contacting said support means for providing a resetting force to said support means in said axial direction wherein said first driving means raises said support means against the resetting force of said first resetting means such that said pinch roller opposes said capstan when said first solenoid plunger is energized.

3. A pinch roller shifting mechanism in accordance with claim 2, wherein said first coupling means comprises a lever arm means connected to said first plunger rod and contacting said support means for moving said support means in said axial direction in response to the axial movement of said first plunger rod, and wherein said first resetting means is a first coil spring which obstructs lever operation of said lever arm means.

4. A pinch roller shifting mechanism in accordance with claim 1, including a second resetting means contacting said second coupling means for providing a resetting force to said support means to maintain said pinch roller at a position away from said capstan wherein said second driving means moves said support means against the resetting force of said second resetting means so that said pinch roller contacts said capstan when said second solenoid plunger is energized.

5. A pinch roller shifting mechanism in accordance with claim 4, wherein said support means rotates in a plane at a right angle to said axial direction of the capstan such that said pinch roller contacts said capstan, wherein said second driving means comprises a first rotary arm coupled to said second plunger rod for converting axial movement of said second plunger rod into rotary movement and a crank arm coupled to said first rotary arm for transmitting the rotary movement of said first rotary arm to said support means to rotate said support means, whereby said first rotary arm rotates according to movement of said second plunger rod to cause said crank arm to move in its lengthwise direction, whereby said support means is rotated according to lengthwise movement of said crank arm and said pinch roller is moved to contact the capstan.

6. A pinch roller shifting mechanism in accordance with claim 5, wherein a second rotary arm which is rotatable about an axis in parallel with the axial direction of said capstan and said second rotary arm includes an engaged part, and wherein said crank arm is provided with an engaging part which engages with said engaged part and transmits a force to said engaged part to rotate said second rotary arm when the crank arm moves in the lengthwise direction whereby said pinch roller contacts said capstan and further wherein said resetting means is a second coil spring which provides a force against rotary movement of said second rotary arm for resetting.

7. A pinch roller shifting mechanism in accordance with claim 6, wherein a third rotary arm is coupled to said second rotary arm, and rotates about an axis in parallel with the axis of said second rotary arm in a direction opposite to the direction of said second rotary arm when said second rotary arm rotates, said mechanism further including first and second guide pins positioned on each side of the line between said capstan and said pinch roller parallel to said capstan, a fourth rotary arm coupled to said first guide pin at one end, said fourth rotary arm being rotatable about an axis parallel with said capstan, a third coil spring for providing a force to said end of said fourth rotary arm, a fifth rotary arm coupled to said second guide pin at one end and rotatable about an axis parallel with said capstan and a fourth coil spring for providing a force to said end of said fifth rotary arm, wherein said second rotary arm engages said fourth rotary arm to prevent said fourth rotary arm from being rotated by the force of said third coil spring, said third rotary arm engages said fifth rotary arm to prevent said fifth rotary arm from being rotated by the force of said fourth coil spring, and said fourth and fifth rotary arms rotate to move said first and second guide pins in the direction from said pinch roller to said capstan when said crank arm moves to cause said pinch roller to contact said capstan and said second and third rotary arms are rotated.

* * * * *